(12) United States Patent
Suprun et al.

(10) Patent No.: US 7,061,469 B2
(45) Date of Patent: *Jun. 13, 2006

(54) METHOD OF DATA INPUT INTO A COMPUTER

(75) Inventors: Anton E. Suprun, Novosibirsk (RU); Dmitri V. Simonenko, Potomac Falls, VA (US)

(73) Assignee: Innalabs Technologies, Inc., Dulles, VA (US)

( * ) Notice: Subject to any disclaimer, the term of this patent is extended or adjusted under 35 U.S.C. 154(b) by 214 days.

This patent is subject to a terminal disclaimer.

(21) Appl. No.: 10/442,170

(22) Filed: May 21, 2003

(65) Prior Publication Data

US 2004/0017353 A1      Jan. 29, 2004

Related U.S. Application Data

(63) Continuation-in-part of application No. 10/209,197, filed on Aug. 1, 2002, now Pat. No. 6,731,268, which is a continuation of application No. 09/511,831, filed on Feb. 24, 2000, now Pat. No. 6,466,200.

(51) Int. Cl.
*G09G 5/08* (2006.01)

(52) U.S. Cl. ...................... 345/158; 345/157; 345/169; 73/514.01; 73/514.02; 73/514.08

(58) Field of Classification Search ........ 345/156–169; 273/148 B; 463/37–38; 348/734; 73/514.08, 73/514.31, 514.01, 514.02
See application file for complete search history.

(56) References Cited

U.S. PATENT DOCUMENTS

| | | | | |
|---|---|---|---|---|
| 4,601,206 A | * | 7/1986 | Watson | .......................... 73/510 |
| 4,984,463 A | * | 1/1991 | Idogaki et al. | ........... 73/514.08 |
| 5,181,181 A | | 1/1993 | Glynn | |
| 5,774,113 A | | 6/1998 | Barnes | |
| 5,831,553 A | | 11/1998 | Lenssen et al. | |
| 5,835,077 A | * | 11/1998 | Dao et al. | .................... 345/157 |
| 5,982,169 A | * | 11/1999 | Furlani et al. | ........... 324/207.2 |
| 6,002,184 A | | 12/1999 | Delson et al. | |
| 6,128,006 A | | 10/2000 | Rosenberg et al. | |
| 6,154,199 A | | 11/2000 | Butler | |
| 6,369,794 B1 | * | 4/2002 | Sakurai et al. | ............... 345/156 |
| 6,466,200 B1 | | 10/2002 | Anton et al. | |
| 6,501,458 B1 | | 12/2002 | Baker et al. | |

(Continued)

FOREIGN PATENT DOCUMENTS

DE          3315958 A1 *   5/1983

(Continued)

OTHER PUBLICATIONS

Computer Internet Website Magellan 3D Controller (also known as Space Mouse), by Logicad, a Logitech Company, address "http://www.Qualixdirect.com/html/magellan.html", 2 pages.

(Continued)

*Primary Examiner*—Lun-yi Lao

(57) ABSTRACT

A computer input device and method used to input coordinates and three-dimensional graphical information into a computer. The device includes an acceleration sensor that has a fixed volume vessel containing a magnetic fluid. A non-magnetic inertial body is located in the magnetic fluid. Three magnetic field sources are located on three perpendicular axes where each magnetic field source has an output for connection to a computer. Changes in Q-factors and inductance of electromagnetic coils aligned on the X, Y, and Z-axis of the sensor are used to compute linear and angular acceleration components of any movement involving the sensor which permits three-dimensional coordinates to be provided in real-time.

57 Claims, 5 Drawing Sheets

U.S. PATENT DOCUMENTS

| | | | |
|---|---|---|---|
| 6,509,888 | B1 | 1/2003 | Tuovinen et al. |
| 6,731,268 | B1 * | 5/2004 | Anton et al. ............... 345/158 |
| 2002/0003527 | A1 | 1/2002 | Baker et al. |
| 2002/0054011 | A1 | 5/2002 | Bruneau et al. |
| 2004/0095317 | A1 * | 5/2004 | Zhang et al. ............... 345/158 |
| 2004/0140962 | A1 | 7/2004 | Wang et al. ............... 345/179 |

FOREIGN PATENT DOCUMENTS

| | | | |
|---|---|---|---|
| DE | 3315958 | A1 | 1/1984 |
| JP | 62-163972 | * | 7/1987 |
| JP | 2-205775 | * | 8/1990 |
| JP | 04-344467 | | 12/1992 |
| JP | 06-344467 | * | 12/1992 |
| JP | 06-213921 | * | 8/1994 |
| RU | 2168201 | C1 | 11/1999 |
| RU | 2166203 | C1 | 1/2000 |
| RU | 2173882 | C1 | 3/2000 |
| RU | 2201618 | C2 | 3/2001 |

OTHER PUBLICATIONS

Computer Internet Website "Logitech 3D Mouse Logitech Head Tra", by Fakespace, Inc., address "http://www.qualixdirect.com/html3d_mouse_and_head_tracker.html", 2 pages.

Computer Internet Website "The Spaceball 3D Controller", by Spacetec IMC Corporation, address "http://qualixdirect.com/html/spaceball.html", 3 pages.

English Translation Abstract for DE 3315958 A1, 1 page, supplied from the *esp@cenet* database.

*Notification Of Transmittal Of The International Search Report And The Written Opinion Of The International Searching Authority*, Or The Declaration, from PCT Application No. PCT/US04/15924, 8 pages, mailed Dec. 9, 2004.

English Translation Abstract to RU 2201618 C2 (AL1).

English Translation Abstract to RU 2173882 C1 (AM1).

English Translation Abstract to RU 2166203 C1 (AN1).

English Translation Abstract to RU 2168201 C1 (AO1).

"IEEE Recommended Practice for Precision Centrifuge Testing of Linear Accelerometers", IEEE Standards 826-2001, The Institute of Electrical and Electronics Engineers, Inc., Nov. 7, 2001, pp. i-86.

"IEEE Specification Format Guide and Test Procedure for Two-Degree-of-Freedom Dynamically Tuned Gyros", ANS/IEEE Std 813-1988, The Institute of Electrical and Electronic Engineers, Inc., 1989, pp. i-91.

Bashtovoi, V.G. et al. "Introduction to Thermomechanics of Magnetic Liquids", High Temperature Institute of the Academy of Sciences of the USSR, Moscow, 1985 (partial translation of p. 13).

"IEEE Standard Specification Format Guide and Test Procedure for Nongyroscopic Inertial Angular Sensors: Jerk, Acceleration, Velocity, and Displacement", IEEE Std 671-1985 (R2003), The Institute of Electrical and Electronics Engineers, Inc., 1985, pp. iii-69.

* cited by examiner

METHOD OF DATA INPUT INTO A COMPUTER

CROSS-REFERENCE TO RELATED APPLICATIONS

This application is a continuation-in-part of U.S. patent application Ser. No. 10/209,197, filed Aug. 1, 2002 now U.S. Pat. No. 6,731,268, which is a continuation of U.S. patent application Ser. No. 09/511,831, filed Feb. 24, 2000 now U.S. Pat. No. 6,466,200 issued Oct. 15, 2002, which claims priority to Russian patent application No. 99122838, filed Nov. 3, 1999, all of which are incorporated herein by reference in their entirety.

BACKGROUND OF THE INVENTION

Field of the Invention

Computer input devices for the input of coordinates and graphic information in a computer typically utilizes a mouse and trackball. Such input devices contain a trackball that generates a signal that corresponds to a position angle and two covers. A positioner is typically located between the covers in a manner that it is only partially raised behind the covers. One of the covers is hinged and is able to move between a closed and open position. A retainer is used to hold the covers in a position that ensures that the positioner is held against a flat surface. A second retainer is typically used to hold both covers in such location and manner that the surface of the positioner is supported by two surfaces and in contact with the flat surface.

The disadvantage of these devices is that it they are limited to controlling only two coordinates, X and Y. Three dimensions (3-d) are typically not possible. Additionally, the device typically requires a special work surface for the device movement, and the parts and assemblies for the device must be manufactured to precise mechanical specifications. Furthermore, the device may easily fail as a result of wear and dust accumulation on the moving parts.

Graphic positioners that provide input for 3 independent coordinates, X, Y, and Z, typically consist of a base with two perpendicular shafts rotating in sets of bearings and a third shaft that is mounted on a bezel in a bearing assembly. Each shaft is mated to a coder that translates the shaft rotation into code. The code is supplied through a cable to the computer in order to control a graphic object on a display.

This device is also limited to controlling one pair of coordinates at a time, (XY), or (XZ), or (YZ). Furthermore, the device typically provides an uncomfortable position for the operator's wrist and a rigidly limited area in which the operator's hand must be located during the manipulations (determined by the shaft's length, where shaft is fixed in a holder and on a base). In addition, the device contains of parts that are difficult to manufacture and are prone to excessive wear due to friction.

Another type of controller for providing three-dimensional input data is a device that has a coordinating handle. This controller typically contains a spheroid inside a stationary casing that freely rotates in all directions. Attached to the spheroid is a handle that can be rotated and moved in any direction. The device also contains inner and outer leverage plates that are attached by hinges to the casing. These leverage plates typically align at intersection planes and rotate simultaneously with the handle. Two angle converters are attached to the casing and driven by rotation of the plate. The rotational angle converter is also typically driven by the handle rotation. Depending on the axial movement of the handle, the rotational angle converter is typically connected or disconnected from the handle by a coupling clutch installed between them. The handle rotation produces electrical signals on the device's output.

The disadvantage of this type of controller is the complex design of the rotating handle. A large number of parts and assemblies require precision machining. Further, a large number of parts are susceptible to wear which will reduce the life of the device.

Another type of input device is a computer-input pen designed-for input of handwritten information. The pen consists of a hollow casing with a writing element having acceleration and pressure sensors. Typically, the acceleration and pressure sensors are mutually perpendicular piezoelectric plates with inertial elements that are placed along the axis of the writing element in two rows. The upper row consists of inertial sensors attached to the lower edges of the piezoelectric plates. These piezoelectric plates are typically parallel to the axis of the writing element. One edge of the piezoelectric plates is rigidly attached to the casing while the other edge is attached to the writing element through the spring-loaded rod. This device only allows for two-dimensional coordinate input of information into computer.

Additionally, none of the preceding types of input devices are able to provide rotational coordinate information to a computer. Rotational measuring is a particularly absent from these device capabilities due to the difficulty in measuring rotational forces.

There is a need for a data input device that is easy to manufacture can provide manipulations in six coordinates, and is capable of gradual adjustment.

SUMMARY OF THE INVENTION

The present invention is directed to electronic and computational equipment and more particularly is directed to a data input device used to input of coordinates, rotational and three-dimensional spatial information and commands, into a computer.

In accordance with the present invention, an input device is provided that allows provides for manipulation and detection of position in six coordinates, and increases reliability, manufacturability, and capability of gradual sensitivity adjustments.

Accordingly, the present invention includes a data input device comprising an acceleration sensor having a data output and a connection between the data output and a computer for transferring data between the input device and a computer. The acceleration sensor includes a closed volume vessel containing magnetic fluid and a non-magnetic inertial body contained in the vessel. There are at least three magnetic field sources located around the acceleration sensor on three substantially perpendicular axes, wherein each magnetic field source has a data output for connection to the computer.

Further the device of the present invention includes a signal converter assembly and switches wherein the outputs of the magnetic field sources are connected to inputs of the signal converter assembly. Additional inputs of the signal converter assembly are connected to outputs of switches. The inputs and outputs of the signal converter assembly are inputs and outputs of the device, which are connected to the computer.

The acceleration sensor closed volume vessel may be sphere shaped or a centrally, symmetrical shaped polygon.

The inertial body may be sphere shaped or a centrally symmetrical shaped polygon. The inertial body may be hollow. Further, the inertial body may be made out of two or more non-magnetic materials.

The present invention also includes magnetic field sources that have a plurality of serially connected current generators and inductor coils, wherein the magnetic field source is a current generator output.

The invention measures differences in characteristics of electromagnetic coils over time such as Q-factors, inductance, and changes in alternating voltages components of the inductors in the three axis as the device is moved along any mutually perpendicular axis X, Y, and Z. These changes are used to determine three components of linear acceleration and three angular acceleration using the acceleration sensor.

Additionally the present invention may include a signal converter assembly that includes an analog to digital converter (ADC), a controller, a serial interface, a level converter and input register, wherein the ADC output is connected through a bi-directional bus to the controller and the input register and the serial interface, wherein the serial interface input and output are connected correspondingly to the output and input of the level converter, and wherein the level converter output and input is an output and input for the device.

The invention may also include a signal converter assembly where the ADC output is connected to an analog output of the signal converter assembly, which connects to inputs of the magnetic field sources, and wherein the ADC is connected by a bi-directional bus to the controller and inputs of the magnetic field source.

Still further, the present invention includes a communication cable for connecting the output of the device to the computer. The acceleration sensor may also be housed in a case.

Additionally the present invention includes an input device where the acceleration sensor and switches are inside a case, and the converter assembly is located in the computer, where the connection with the computer is provided through the multicore cable which then connects the acceleration sensor and switches outputs to the corresponding inputs of signal converter, and where the signal converter output is connected directly to the computer.

Further, the invention includes an input device where the case is compact and fits in the operator's palm and wherein the acceleration sensor is located in the case of the device in such a manner that an Y axis of the sensor is directed forward, a X axis to the right, and a Z axis the top direction relative to the operator, and where the switches are placed under the operator's fingers. The switches may be located in a separate case, and the switches output may be connected to the converter assembly by a multicore cable.

The present invention also includes a device where the case of the device is stationary and the inertial body is movable relative to the case and where the acceleration sensor is mechanically connected to control devices that are located on the three mutually perpendicular axis.

Further, the present invention may include additional acceleration sensors that are added to the device and where additional inputs are added to the signal converter assembly for each of the additional acceleration sensors.

Still further, the present invention includes a device that has a connection with the computer through radio waves or other wireless means. The connection with the computer may occur through a bi-directional channel.

The present invention may be used to create a virtual reality suit by using several acceleration sensors attached to an operator's limbs and body to input overall body movement data into a computer. Any part of a body can be equipped with a sensor device to input 3d movement into a computer.

Using a computer to coordinate multiple input devices, complex motion can be accurately interpreted for any human activity such as game playing or precision human-machine interaction such as instrument control in a surgical operation.

Additionally, the present invention is suitable for use on any object whereby necessity of tracking movement is desired.

DETAILED DESCRIPTION OF THE INVENTION

Figure 1:
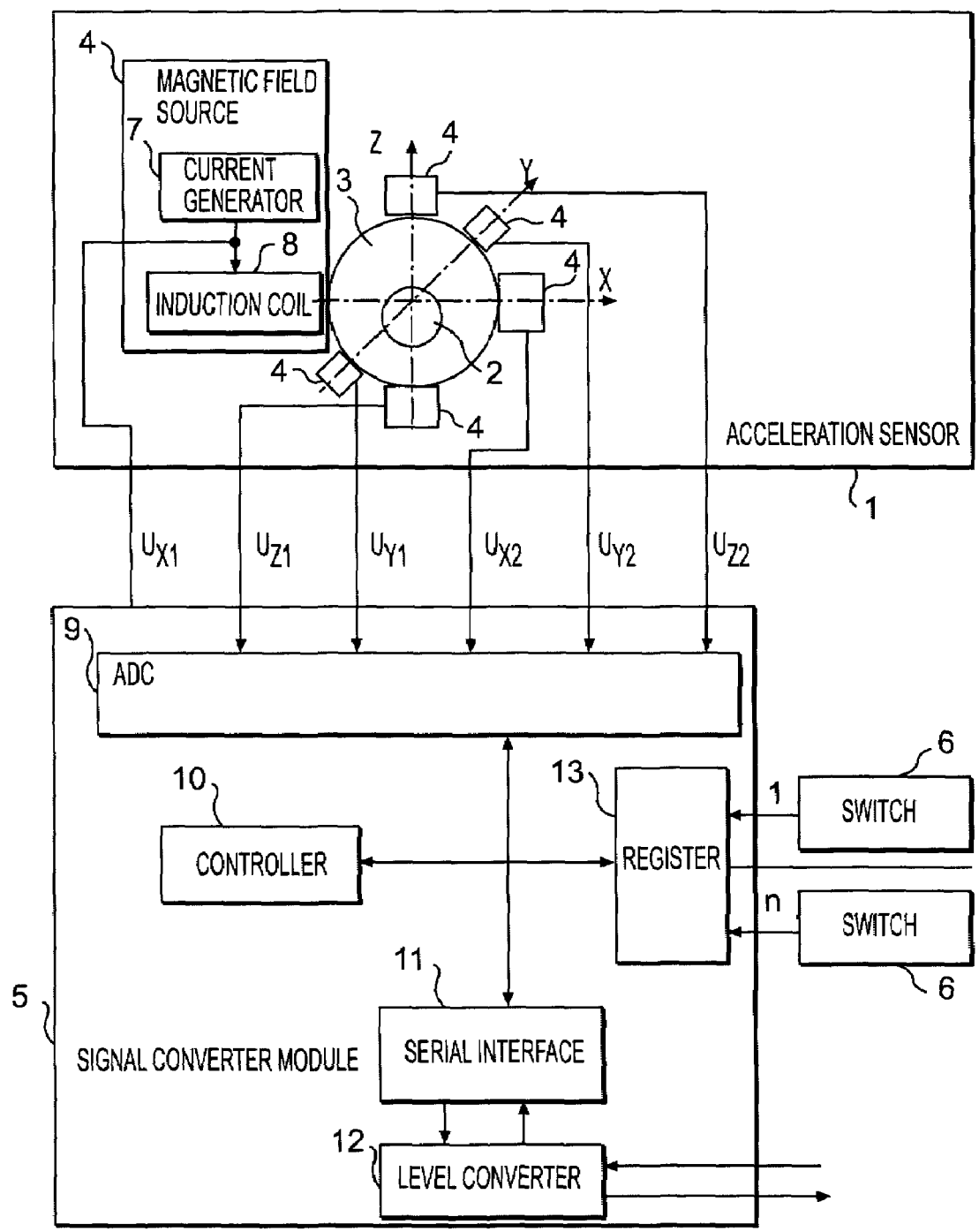
FIG. 1 is a diagrammatic view of an input device in accordance with the present invention.

In accordance with the present invention, an input device is provided that allows for three dimensional manipulation and detection of movement in as many as six degrees of freedom. Further, the invention provides increased reliability and manufacturability. Still further, the invention provides the capability of gradual sensitivity adjustments. Briefly summarized, one embodiment of the present invention includes an input device having an acceleration sensor housed in a casing with a communication line to connect the device to computer. The acceleration sensor is a symmetric inertial body made of non-magnetic material that is placed in a closed volume of magnetic fluid.

Three couples of magnetic field sources are located around the non-magnetic inertial body on mutually perpendicular axes. The device is equipped with signal converters and switches where outputs of magnetic field sources are connected to analog inputs of an analog to digital converter and outputs of the analog to digital converter are connected to the switch outputs. Additionally, serial inputs and outputs of the signal converter are used for output and input connectors for the computer.

The proposed computer input device allows for manipulation of the object independently in six degrees of freedom, represented by three components of linear acceleration $a=\{a_x, a_y, a_z\}$ and three angular acceleration components $\psi=\{\psi_x, \psi_y, \psi_z\}$.

The device is easy to manufacture due to the low precision requirements of the dimensions of the acceleration sensor, low precision of the current generator adjustments, and the use of printed circuit technology for manufacturing the electrical magnets, as well as overall low number of parts. Reliability of this computer input device is increased by the absence of mechanical contact between its parts.

Gradual adjustment of sensitivity can be arranged either through adjustment of current levels on electrical magnets or by changes of the magnetic field source proximity. In either case there is no need to replace parts in the device. It is also possible to arrange for the adjustment from the software setting from the computer.

An embodiment of the proposed computer input device with an acceleration sensor is based on the properties of the magnetic fluid. Expulsive forces are developed around a non-magnetic body immersed in magnetic fluid. The potential and distribution of the magnetic field lines in the magnetic fluid determine the direction and magnitude of such expulsive force. (S. V. Rulev, V. N. Samsonov, A. M. Savostianov, G. K. Shmyrin, "Controlled Vibroinsulators with Magnetic Fluid", MO USSR, M., 1988, pages 17–21, incorporated by reference herein in its entirety).

Therefore, the magnetic fluid should be viewed relative to the body made of the non-magnetic material as an environment which the effective density is increased proportionately to the increase of the magnetic field force.

The magnetic fluid may be a two-phase system that possesses both flowability and high sensitivity to an applied magnetic field. The particle size of the solid phase of the mixture in one embodiment may be about $1 \times 10^{-9}$ meters. One type of suitable magnetic fluid is a low viscosity dispersion of magnetite or loadstone in kerosene, having a density between about 1.1 and about 1.5 grams/cubic centimeter. The kerosene dispersion has an effective viscosity between about 0.005 and about 0.1 PAs and has magnetizability under a 250 kA/m magnetic field between about 30 and about 50 kA/m.

Another suitable magnetic fluid is a low viscosity dispersion of magnetite in liquid organic silicone having a density between about 1.1 and about 1.5 grams/cubic centimeter. The silicon dispersion has an effective viscosity below about 0.7 PAs and has a magnetizability under a 250 kA/m magnetic field of about 25 kA/m. Further, a magnetoreactic suspension of dispersed ferromagnetic matter in liquid organic silicone may serve as a suitable magnetic fluid. The magnetoreactic suspension has a density between about 3.4 and about 4.0 grams/cubic centimeters, a friction of factor of about 0.1 to about 0.2, and a wear rate between about $2 \times 10^{-7}$ and about $8 \times 10^{-7}$. The acceleration sensor is a closed volume vessel, such as a sphere or a centrally symmetrical polygon, filled with magnetic fluid. A magnetic field is then created inside the vessel in such a manner, that forces increase from the center of the volume.

In order to configure the magnetic field in the described manner, three pairs of magnetic field sources (electromagnetic coils) are attached to the sensor surface on three perpendicular axes. These coils are used to create alternating magnetic fields in the magnetic fluid. The intensity of the alternating magnetic fields is substantially less than would be of a constant magnetic field. The induction vector of the alternated magnetic fields is alternatively rotated in vertical and horizontal planes of the operating area of the magnetic fluid filled vessel.

Figure 5:
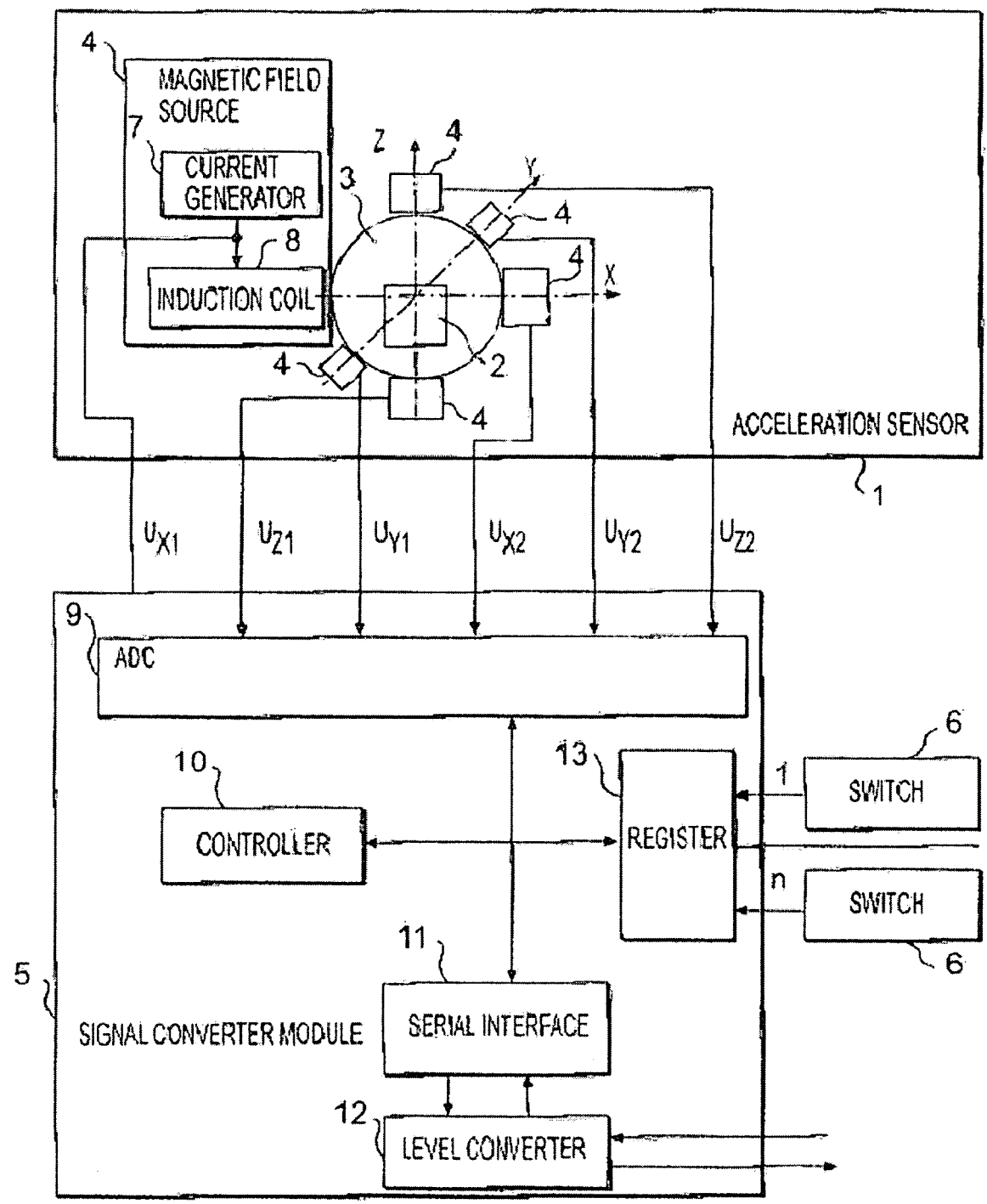
FIG. 5 is a diagrammatic view of an input device in accordance with another embodiment of the present invention that uses a cubical inertial body.

A symmetrically shaped inertial body, such as a sphere (see FIG. 1) or a centrally symmetrical polygon (see FIG. 5), made of non-magnetic material such as plastic or plexiglass is placed into the magnetic fluid. The shape of the inertial body may be spherical or a centrally symmetrical polygon. Further, the inertial body may be hollow. The inertial body may consist of two or more non-magnetic materials. The inertial body may have a density close to that of the selected magnetic fluid.

Due to the radial gradient of the magnetic field force, the effective density of the magnetic fluid increases in the direction from the center of the acceleration center. Therefore, the inertial body is being pushed toward the equilibrium point that is close to the geometric center of the acceleration sensor.

After the acceleration sensor is moved, the inertial body, being in transitional state, is moved away from the equilibrium center, which in turn leads to the change in thickness of magnetic fluid located underneath each coil.

The alternating magnetic field of each coil interacts with a volume part of magnetic fluid adjacent to it; where this volume fraction is determined by the distribution of the magnetic field lines, and the depth of the volume fraction is determined by the inertial body position.

The quantity and properties of the magnetic fluid in the fraction of the volume directly relates to and determines the amount of energy needed for flux reversal magnetization of the magnetic fluid.

The Q-factor of the coil can now be measured by the amount of energy spent on alternating the magnetic field, which depends on the amount of magnetic fluid in the affected volume fraction, which in turn depends on the position of the inertial body in the sealed container. The inertial body is displaced due to acceleration caused by movement of the acceleration sensor. As displacement occurs, the Q-factor of each coil changes as the inertial body moves away from the equilibrium point.

Additionally, the image impedance of the electric magnet (each coil) will change accordingly. The impedance change leads to a change of voltage on the electrical magnets (coils), where amplitudes of the potential will change in antiphase on the coils on which the axis force is applied to the acceleration sensor. After the movement of the sensor, the differential of the current (amplitude) variable component increases in each couple of coils and is proportional to the acceleration applied to the corresponding axis. It is the possible to describe the movement of the sensor along any space trajectory.

When the sensor is being rotated along the axis, the magnetic fluid acts as an inertial body, which moves in the magnetic field. The magnetic field is inhomogeneous in the direction of the rotation. Acceleration in the flow of the magnetic fluid resulting from the rotation leads to a change in impedance in the electric coils for these coils along which the magnetic fluid is moving. Such change in impedance, which results from a loss of magnetic field energy to reversal magnetization of moving magnetic fluid, leads to in-phase change coils voltage. The magnitude of the voltage change is proportionate to angular acceleration of the acceleration sensor. Therefore, the magnitude of the voltage change is used to describe the axial rotation of the acceleration sensor at any axis.

The device of the present invention provides for independent sensing of movement along three spatial (linear) and three angular degrees of freedom. The device output signal contains information about six independent degrees of freedom.

Reliability of the device is increased by the absence of the contacting mechanical parts and ease of manufacture is increased by the absence of the requirements for precision machining of the acceleration sensor parts. Many of the parts may be manufactured by injection molding from plastic. Electrical magnets may be manufactured by the printed circuit technology in order to eliminate need for coiled parts to further simplify the device manufacturing.

Sensitivity adjustment of the input device may be achieved by changing the medial potential of the magnetic field in the magnetic fluid. A change in the magnetic field can be either due a to change of current in the coils or a change in proximity of the magnetic field sources from the surface of the acceleration sensor.

The proposed input device may be used for input of coordinate information, graphical information and controlling computer generated objects, which may be valuable in such computer applications as computer games and 3-dimensional designs, etc., and as a substitute for a mouse, keyboard or the like.

With reference now to FIG. 1, there is shown a skeleton diagram of an embodiment of the input device in accordance with the present invention. The following symbols are used: $U_{x1}$, $U_{x2}$—voltages on the acceleration sensor output that corresponds to the X axis; $U_{y1}$, $U_{y2}$—voltages on the acceleration sensor output that corresponds to the Y axis; $U_{z1}$, $U_{z2}$—voltages on the acceleration sensor output that corresponds to the Z axis.

The computer input device contains an acceleration sensor (1) that consists of symmetrical inertial body in the shape of a sphere (2) that is made from a non-magnetic material (e.g. plastic or plexiglass) and is placed in a closed volume filled with magnetic fluid (3). Three pairs of magnetic field sources (4) are located in pairs around the vessel with the magnetic fluid (3), at the ends of each mutually perpendicular axis (note that only five of the six sources are shown in FIG. 1). A signal converter module assembly (5) and switches (6) are provided where the magnetic field source is serially connected to current generator (7) and induction coil (8), and where the current generator input is connected to the output of the magnetic field source (4).

Moreover, the signal converter assembly (5) contains a six-channel analog to digital converter ADC (9), a controller (10), a serial interface (11), a level converter (12) and an input register (13), where the input register inputs are digital inputs of the signal converter assembly (5) and analog inputs of the signal converter assembly (5) are inputs of the ADC (9). The ADC output is connected through bi-directional bus with the controller (10), input register (13) and serial interface (11), the input and output of which are correspondingly connected to the output and input of the level converter (12). The output and input of the level converter is the device output and inputs. The outputs of the acceleration sensor (1) are connected to the analog inputs of the signal converter assembly (5), and the digital inputs are connected to the switches (6), where one of the switches is employed as an indicator of the operator activity and remaining switches are used by the operator to control the software on the computer.

Analog outputs of the signal converter (5), which are outputs of a six channel ADC (14), are connected to the control terminals of the magnetic field sources (4), which are inputs of the current generator (7). Digital inputs to the ADC (14) are connected by a bi-directional bus with the controller (10).

Magnetic coil (8) may be connected to a parallel resonance circuit in order to register changes in the coil's Q-factor.

Various designs of adjustable voltage current generator (7) on transistors or operational amplifier IC are described in P. Horovitz, W. Hill "The Art of Circuit Engineering", 3 volumes, published in Moscow by Mir in 1993, herein incorporated by reference in its entirety.

The signal converter (5) may be based on MC68HCO$_5$B6 chip, with serial input and output connected correspondingly to the output and input of the level converter, which can be designed around ADM203 chip. MC68HCO$_5$B6 is an 8-bit single chip microcontroller that contains HC05 microprocessor core, 6 Kbyte ROM, 176 byte RAM, 8-channel, 8-bit ADC with built-in reference voltage generator, multipurpose timer, clock generator which requires external quartz resonator and passive filter, and RS-232 serial interface. The serial interface is an example but could be any communication method that permits processor to processor communication. Connection diagram and detailed description of this microcontroller can be found in "MC68HCO$_5$B6 Technical Data" Rev. 3 1995.

An AD7228A chip may be used as a 6-channel ADC in signal the converter module. The AD7228A has a built-in reference voltage generator, and requires single +5V power source.

To create additional analog inputs in the signal converter assembly, one or more AD 7828 chips may be employed as an 8 channel, 8-bit ADC. They require a +5V power source and a filtered +5V power source may be used as reference voltage.

Technical specifications of AD7228A and AD 7828 may be found in 1996 Short Form Designer Guide, Analog Devices, 1996.

The ADM203 chip has two channels of logical signal converter with 0 and +5V levels in RS-232 signals ands two converter channels from RS-232 into 0 and +5V logical signals. No passive elements are required. Technical specifications and connection diagrams of ADM203 chip may be found in ADM2XXL Family for RS-232 Communications, Rev. 0, 1994.

In accordance with the present invention, the magnetic field sources are serially connected to a current generator and induction (magnetic) coil, where the current generator input is connected to the output of the magnetic field source. In order to simplify the device's manufacturing, additional sources of the magnetic field may consists of several interconnected coils. In order to reduce power consumption, one or more constant magnets may be added to the source of magnetic field. Further, several additional magnetic field sources may be introduced in the device. The outputs from these additional sources are typically not connected.

The present invention may contain a signal converter assembly that contains the ADC, controller, serial interface, level converter and input register. The signal goes to the ADC input and the output is connected through bi-directional bus to the controller, input register and serial interface. The serial interface input and output is connected correspondingly to the output and input of the level converter. The level converter output and input is also an output and input for the device.

To provide for gradual sensitivity adjustment by computer software, ADC is added to the converter assembly. The ADC output is connected to the analog output of the signal converter, which connects to control inputs of the magnetic field sources. The ADC is connected by a bi-directional bus to the controller. The control input of the magnetic field source is the control input for the current generator.

The acceleration sensor and switches are typically inside the case for the device, but the converter assembly may be located in the computer where the connection to the computer is provided through a multiple conductor wire cable to connect output from the acceleration sensor and switches outputs to the corresponding inputs of the signal converter. The signal converter output is typically connected directly to the computer.

Additional acceleration sensors (the number of such is denoted by the letter "m") may be added in order to be placed on the moving object, where 6.times.m analog inputs are added to the signal converter assembly. Such modifications would allow the device to be used for Virtual Reality suites, for robot training, or may be placed on an object for investigation of its destructive deformation (as in a car crash test).

Figure 2A:
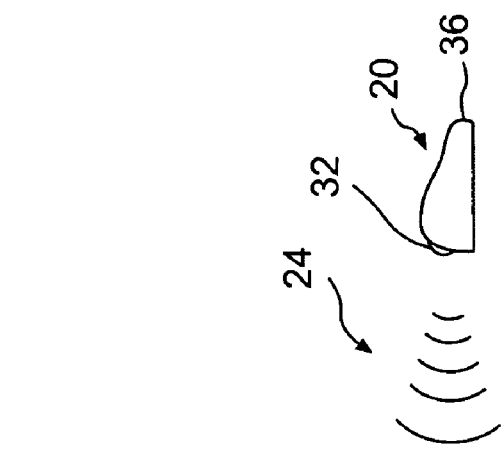
FIG. 2 is a diagrammatic view of an input device in accordance with the present invention with a) a radio communication connection to the computer and b) a cable connection to the computer.
Figure 2B:
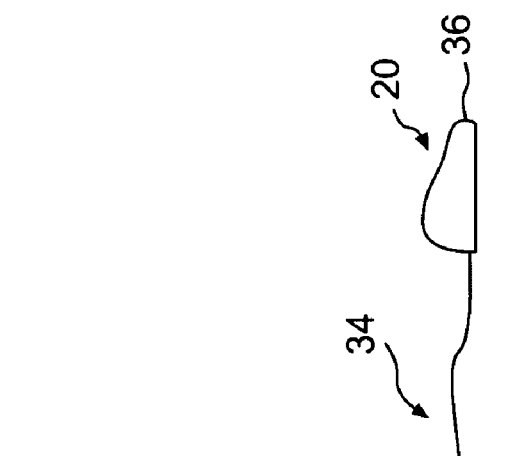

With reference now to FIG. 2 and continuing reference to FIG. 1, there is shown the device of the present invention 20 connected to the computer 22 by a) radio waves 24 or b) by a cable 34.

In one embodiment, a case 36 may be provided to house the acceleration sensor where the case of the device is stationary and the inertial body is movable relative to the case. The acceleration sensor may be mechanically connected to the control device and is located on the three mutually perpendicular axes. The acceleration sensor is located in the case of the device in a such manner that the Y axis of the sensor is directed forward, the X axis to the right, the Z axis to the top, and the sensor is placed under operators fingers. The case of the input device should be compact and able to fit in the operator's palm.

The switches may be located in a separate case, where the switch output is connected to the converter assembly by multiple conductor wire cable. The number of the installed switches is determined by the required capabilities, where one of the switches is employed as an indicator of the operator action.

As mentioned above, the communication between the input device 20 and the computer 22 can occur by radio waves 24. Typically a radio receiver 26 is located with the computer 22 either inside or outside the computer case 28, where a receiver radio receiver output is connected to the computer through an interface device that ensures matching of the computer to the receiver's output. A receiving antenna 30 is located on the computer case 28. The device 20 has another antenna 32 that is connected to the transmitter output associated with the device. A rechargeable battery may be placed in the device case. The recharging contacts of the battery may be on the outer surface of the case and connected to the power supply inputs of the transmitter and converter assembly. The output is typically connected to the input of the transmitter. The radio communication link with the computer typically occurs through a bi-directional channel.

The input device works in the following way:

While the device is not in motion, the non-magnetic inertial body (2) is located near the center of the magnetic fluid filled vessel (3) of the acceleration sensor (1). This position of the inertial body creates a magnetic field in the magnetic fluid (3). The intensity of the magnetic field increases away from the center of the vessel of the acceleration sensor (1), which ensures positive gradient of effective density of the magnetic fluid (3) that is also directed away from the sensor center. Therefore the inertial body (2), not being influenced by the magnetic field, is displaced to the point of lowest effective density of the magnetic fluid (3), to the proximity of the geometrical center of the magnetic fluid (3) filled volume of the acceleration sensor (1).

A symmetric (e.g. sphere) shaped inertial body that is enclosed in magnetic fluid filled volume ensures approximate equal thickness of the magnetic fluid between the inertial body and the sources of magnetic field (4). The magnetic field source consists of the current generator (7) and coil (8). In order to register coils Q-factors, the current generator (7) output contains an alternating current (AC) component. The amplitude of the alternating component for each generator is less than the DC component (in the design version with constant magnets, generator output may entirely consists of alternating component to reduce power consumption). The amplitudes of alternating component for each current generator (7) are approximately equal.

Thickness of the magnetic fluid layer is nearly equal relative to each of the magnetic coils (4) on the X and Y axis which ensures fairly good uniformity of Q-factors on all the coils (8). Therefore, alternating current voltages in the static state of the device are approximately equal on the acceleration sensor (1) outputs responsible for the X and Y-axis. As will be seen in the formulas below, since actual values of "static" voltages on corresponding coils are used, then the difference in Q-factor values resulting from mechanical imperfections or mal-adjustments in the sensors may be ignored, as they do not affect accuracy.

Therefore, differences in Q-factor of the coils on the Z-axis due to offset of the inertial body (2) on this axis do not result in inexact acceleration measurement on the Z-axis.

Acceleration sensor (1) sensitivity adjustments are achieved by changing the medial level of magnetic field in the magnetic fluid (3). The change can be made by changing the DC component magnitude on the current generator (7) or by decreasing/increasing the magnetic source proximity from the center of the accelerator sensor (1).

A change in the DC component may be controlled by a computer through the input of the device by changing the voltage on the ADC (14) output and therefore controlling the current generator (7). There are two ways to adjust the accelerator sensor. First, the acceleration sensor may be adjusted independently from the computer software by changing the proximity of the magnetic field sources (4) relative to the center of the acceleration sensor (1) or by manually changing the DC component of the current generators (7). Second, the acceleration sensor may be adjusted by computer commands that change the voltage on the analog outputs of the signal converter (5).

The inertial mass (2) damping coefficient of the magnetic fluid changes as a result of moving away from an equilibrium state. The damping coefficient determines the amplitude (gain)-frequency response by the magnitude of the inertial mass (2) displacement from the equilibrium state under a specified acceleration level applied to the acceleration sensor (1). Therefore the range of the magnetic fluid thickness change is being measured relatively to each of the magnetic field sources (4), which is in turn determines the range of reactance change on the coil (8). Thus the adjustment of change in the amplitude of the alternating component on the outputs of the acceleration sensor (1) takes place.

In order to match the dynamic range changes in output voltage of the acceleration sensor (1) to the fixed range of the ADC microcontroller in the signal converter assembly (5), it may be necessary to serially connect a six channel AC amplifier on the inputs of the ADC microcontroller. Such an amplifier may be designed as an active filter. In order to reduce precision machining requirements to the assemblies and parts of the acceleration sensor (1) and to provide for adjustable amplifier channels in ADC (9), actual voltages on the acceleration sensor in the stationary state may be recorded into controller (10) after being converted into the digital state by the ADC (9).

Input data from the device to the computer may occur according to the following example: when the switch indicating operator activity is engaged, and movement of the device by the operator's hand caused acceleration along the X-axis, the inertial body (2) will move to the left from the equilibrium position and the thickness of the magnetic fluid (3) under the left coil will decrease and increase under the right coil.

As a result of the affected volume changes, both Q-factor and alternating current voltage of the right coil will decrease. Based on measurements of the AC change in the X-axis coils, acceleration can be quantified. Signals from the acceleration sensor (1), after being digitized by the ADC (9) directed to the controller (10), where X axis acceleration is estimated as follows:

$$a_x = p \times [(U_{x1} - U_{x1}^0) + (U_{x2} - U_{x2}^0)] \quad \text{(Formula 1)}$$

In Formula 1, p is a factor determined by the geometric dimensions of the acceleration sensor (1) and the magnetic fluid (3) properties under a constant magnitude of the magnetic field DC component in the magnetic fluid (3).

$U_{xi}$ is the momentary magnitude of the AC component on the "i" number of output terminal of acceleration sensor (1), which corresponds to the X axis; and $U_{x1}^0$ is the amplitude of the AC component on the "i" number of output terminals of the acceleration sensor (1), which corresponds to the X-axis in the stationary state of the device.

Acceleration components $a_y$ and $a_z$, which correspond to the Y and Z-axis are determined in the manner consistent with Formula 1.

In Formula 1, P is factor determined by the geometric dimensions of the acceleration sensor (1) and the magnetic fluid properties (3) under a constant magnitude of the magnetic field DC component in the magnetic fluid (3);

$U_{yi}$ is the momentary amplitude of the AC component on the "i" number of output terminals of the acceleration sensor (1), which corresponds to the Y axis; and $U_{yi}^0$ is the amplitude of the AC component on the "i" number of output terminals of the acceleration sensor (1), which corresponds to the Y-axis in the stationary state of the device.

Angular acceleration $\psi_x$, which describes the rotation around the Y-axis, is determined by Formula 2:

$$\psi_x = P \times [(U_{y1}, U_{y1}^0) + (U_{y2} - U_{y2}^0)] \quad \text{(Formula 2)}$$

$\psi_y$, $\psi_z$, are determined in a similar manner.

Because relationship $\psi(U_{y1}, U_{y1}^0, U_{y2}, U_{y2}^0)$ has cyclical properties with a cycle of 180°, unambiguous solutions of the rotational angles around X and Y-axis are possible only where the condition $-90° < \psi < 90°$ is satisfied. In the event that rotational angle of acceleration sensor exceeds 180°, in order to resolve the angle unambiguously, it is necessary to calculate the number of completed extrema in the $\psi(U_{y1}, U_{y1}^0, U_{y2}, U_{y2}^0)$ relationship. This can be accomplished in the firmware of the device or in the host computer as it receives the coordinate information.

All three components of linear acceleration together with the three components of the angular acceleration described by Formula 1 and 2 are packetized and transferred to the host computer. The real time sampling is related to the motion speed that is to be sampled. This sampling and reporting can occur at very high rates typically in the 0.5–10 millisecond range and if necessary, even faster sampling is achievable. The packets are processed according to the specific software application package running on the computer platform (22).

As another example and further explanation, a 90° Y-axis rotation of the acceleration sensor is now modeled, given that the acceleration sensor is a sealed container with radius of "2r" and the inertial body is a round sphere with radius "r". Assume also that the equilibrium point of the Z-axis vertical offset between geometric center of the inertial body and the same of the sealed container equals "½r". Additional assumption is that P power of the alternating magnetic field of each inductance coil, dissipated in the magnetic fluid is proportional to the distance from the inner wall of the sealed container to the surface of the inertial body. Measurement is now done relative to the axis of each coil, i.e., $P_i = K \cdot 1_i$.

In the case when a coil's Q-factor magnitude is determined primarily by the properties and quantity of the magnetic fluid, it can be stated that $P_i = k \times i_i^2 \times Ri$; where $i_i$ is the alternated current component force on each coil, Ri is effective resistance of the coil bridging equivalent, determined by the magnetic fluid. In the event that the alternated current component forces on each coil are equal, then $L_1/L_2 = R_1/R_2$, or according to Rowland's law $L_1/L_2 = U_1/U_2$, where $U_i$ is alternated current voltage component magnitude.

Now consider two positions of the accelerator sensor:

1) X-axis is horizontal, Z-axis is vertical, and
2) A second position due to rotation around the Y-axis of 90°, resulting in the X-axis becoming vertical compared to the first position.

For coils placed on the X-axis it is apparent that in the first position (1), distances from each coil to the inertial body are:

$$L_1 = L_2 = 2r - \frac{\sqrt{(3)}r}{2} = r \times (4 - \sqrt{3}\,r)/2$$

In the second case (2), $L_1 = r/2$, $L_2 = 3r/2$.

In case (1), amplitudes of the alternating voltage components on the coils are:

$$U_1 = U_2 = k \times i \times L_1 = k \times i \times r \times (4 - \sqrt{3}r)/2 = U_0$$

And for the second case (2):

$$U_1 = k \times i \times r/2,\ U_2 = 3 \times k \times i \times r/2$$

In order to quantify the acceleration sensor rotation angle, it is calculated as:

$\Delta U = U_1 - U_2$, therefore for the first case (1) $\Delta U = 0$, and in the second case (2) $\Delta U = k \times i \times r$ Consequently, when the acceleration sensor is rotated 90° around the Y-axis, change of $\Delta U$ from 0 to $\pm k \times i \times r$ (where negative or positive result would indicate the rotational direction).

Additionally, the signal amplitude change on each coil (compared to the zero rotation angle of the sensor) is calculated as:

$$\Delta U/U_0 = 2 \times (k \times i \times r)/(k \times i \times r)/(4 - \sqrt{3})$$

or about 88% or the original signal level. Thus this determination provides high sensitivity of the present invention in determining rotational angles of the acceleration sensor on the X and Y-axis.

Additionally, when the sensor is rotated, differences in a sum of changing signals of voltage components on the axis around which the acceleration occurs is proportionate to the rotational angle. In the case of lateral movement of the sensor, the difference in alternating current components is proportional to the acceleration. This allows for separation of rotational and displacement signals, which facilitates registration and calculation of angular degrees of freedom to be transferred to the computer.

The example above illustrates that this method allows for independent detection of movement along three spatial degrees of freedom and rotation around three axes, producing six independent coordinates of data. The use of the coil's Q-factor for measurement of inertial body displacement ensures good precision and sensitivity. This method can also be used to input three dimensional coordinates, or graphical, alphanumeric information or commands.

Linear a=$\{a_x, a_y, a_z\}$ and angular $\psi$=$\{\psi_x, \psi_y, \psi_z\}$ acceleration components are calculated by the formulae 1 and 2, after collecting the information from every channel of the ADC (9) that are occurring according to the instructions contained in the ROM of the signal converter assembly, where temporary data and results of the calculations are contained in the RAM of the microcontroller which is a part of the controller (10).

Sufficient size of the ROM and RAM, which facilitates the programming task of formula 1 and 2, supplements the microprocessor core HC05 used for mathematical calculations and process control. Real time calculation of acceleration is handled by the controller (10) with equal time slices, which are determined with a built-in multifunctional timer.

Calculated components of linear and angular acceleration along with the data describing the state of the switches (e.g., logical 0 may be assigned to the engaged state and logical 1 may be assigned to the disengaged switch state), are joined in the packet by the controller (10) which is transferred to the input of the serial interface (11) (which is a feature in the microprocessor hardware). The microprocessor converts the parallel binary code into serial together with synchronization instructions, error detection and correction, and other associated data.

From the output of the serial interface (11), the data packet arrives to the input of the level converter (12), where logical 5V signals are converted according to the serial interface specifications. Through the connection cable, this information is transferred to the computer where the software driver interprets the data according to the application requirements. For example, the software package on the computer may use the devices information to control the object's position in three dimensional space where the object is moved only when the button (one of the six switches) is engaged, including the button which signals operators action. When operator presses any of the other buttons, objects may be selected, a pop-up menu may appear, etc. The total number of control switches may be up to 5–(n≦5) in this example.

Figure 3:
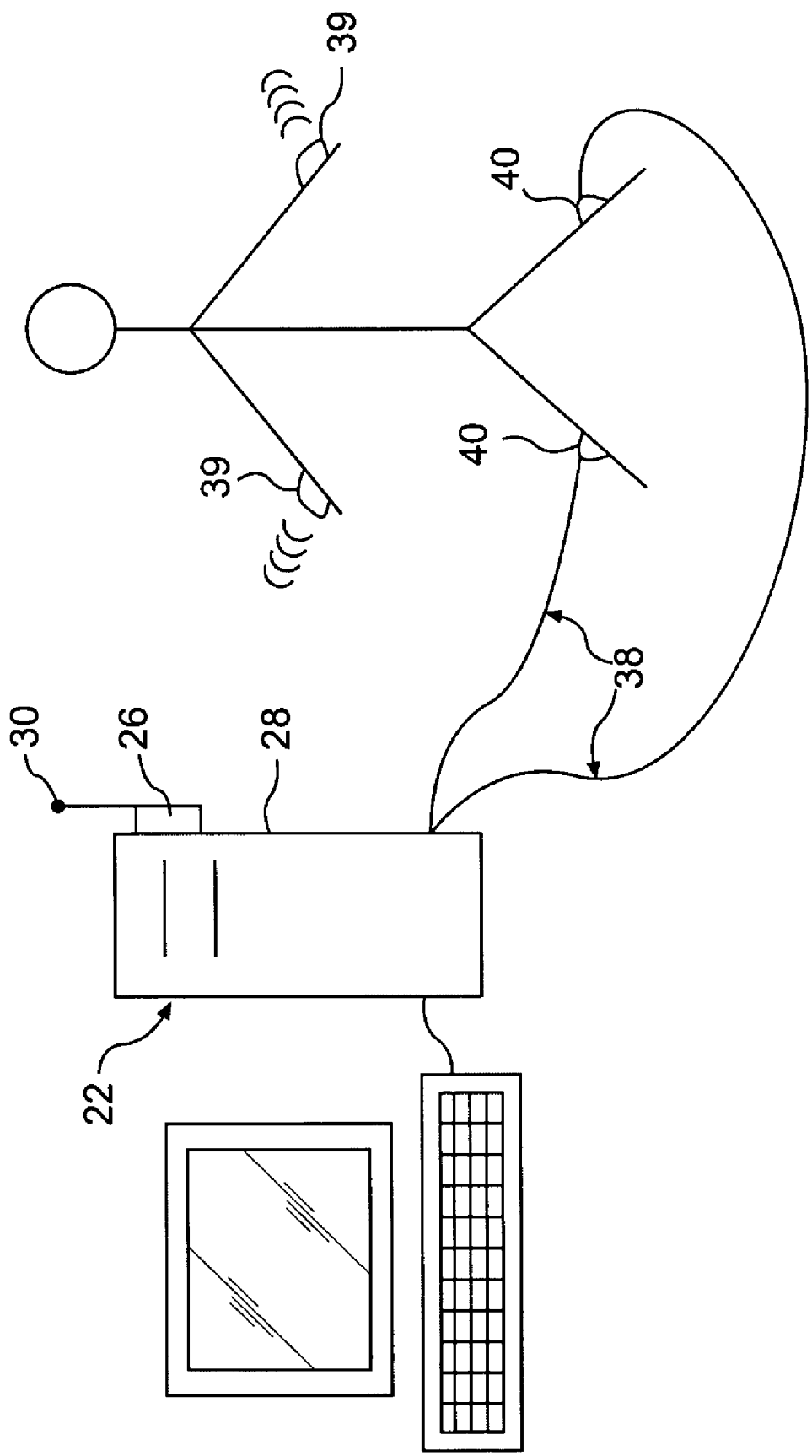
FIG. 3 is a diagrammatic view of multiple input devices attached to an operator's body in accordance with the present invention.

Use of several accelerator sensors as described in the proposed device for the computer information input may be used to create a "Virtual Reality Suite", where sensors will be attached to the operators extremities and body as shown in FIG. 3. Two wireless sensors (39) and two wired sensors (40) connected by cables (38) provide multiple inputs. Any number of sensors could be employed and more than one computer platform (22) may be necessary. Software in the computer platform (22) associates the movement of each of the independent sensors as needed according to its application. As examples, it may be used for robot training, training simulators and virtual reality computer games, aids for the handicapped, or remote control of precision tools by an operator.

When additional ADC (9) channels are required, they may be obtained by either multiplexing the existing ADC channels or by connecting additional ADC chips to a signal converter assembly (5) with their digital outputs connected to the controller (10) by a bi-directional bus.

In this way the proposed device allows for independent manipulation of six independent degrees of freedom represented by three linear components a=$\{a_x, a_y, a_z\}$ and three angular $\psi$=acceleration components $\{\psi_x, \psi_y, \psi_z\}$. Based on the information supplied by the device software driver, the computer is able to calculate movement and absolute coordinates (linear as well as angular) in 3D space.

Figure 4:
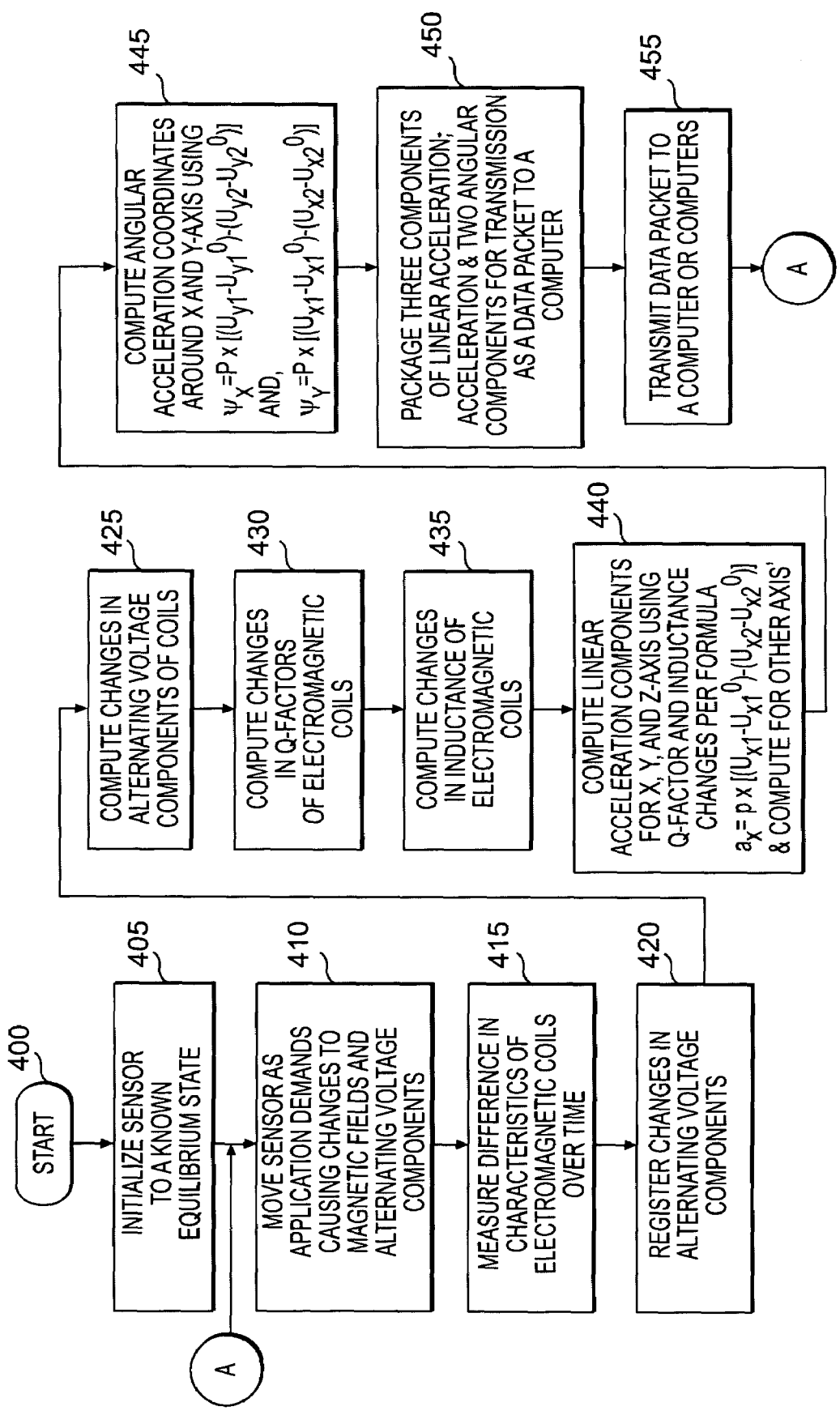
FIG. 4 is a flow diagram summarizing the steps involved in using the method of the present invention.

Referring now to FIG. 4, the flow diagram summarizes the steps in using the present invention method. The process starts at step 400 that begins the use of the sensor or sensors in detecting linear and angular acceleration and reporting the data to a computer. At step 405, the internal software is initialized to a known state indicative of the initial equilibrium condition of the inertial body and magnetic fields within the sealed vessel of the sensor.

At step 410, movement of the sensor, as necessary for use in an application, causes changes to the magnetic fields in the sealed vessel and alternating voltage components in the electromagnetic coils.

At step 415, several differences in characteristics of the electromagnetic coils are measured over a period of time. These measurements include registering changes in the alternating voltage components as shown at step 420, and at step 425 computing the changes in alternating voltage components at the mutually perpendicular electromagnetic coils. Computations of the electromagnetic coils' Q-factors changes are performed at step 430. At step 435, changes in inductance of the electromagnetic coils are computed.

Given the changes in Q-factors and inductance of the coils, at step 440, the linear acceleration components of the x, y, and z-axis can be computed using Formula (1) above.

At step 445, the angular acceleration degrees of freedom around the x and y-axis is computed using Formula (2) above.

At step 450, the three components of linear acceleration and three angular components are packaged as a data packet for transmission to a computer.

At step 455, the packet is transmitted to one or more computers as necessary for the application in which the sensor or sensors are employed to detect and report three-dimensional movement. This process continues in real-time as indicated by "A", according to the application.

The operator can set the origin (calibration reset) for coordinate calculations through pressing or engaging one of the switches on the device. This initializes the acceleration sensor to a known starting state typically representative of a stable state (e.g., no motion).

Reliability of the proposed computer input device is ensured by the absence of the frictioning parts or assemblies.

The device is easy to manufacture due to the absence of the precision parts in the acceleration sensor, low precision requirements to the current generator adjustments, possibility to manufacture magnetic coil by printed circuit technology, and the limited number of parts in the device.

Those persons skilled in the art will readily understand that the present invention is susceptible to broad utility and application. Many embodiments and adaptations of the present invention other than those herein described, as well as many variations, modifications and equivalent arrangement, will be apparent from or reasonably suggested by the present invention and the foregoing description without departing from the substance or scope of the present invention.

Accordingly, while the present invention has been described in detail in relation to its preferred embodiment, it is to be understood that this disclosure is only illustrative and exemplary of the present invention and is made merely for purposes of providing a full and enabling disclosure of the invention. The foregoing disclosure is not intended to be construed to limit the present invention or otherwise exclude any other embodiments, adaptations, variations, modifications or equivalent arrangements, the present invention being limited only by the claims and the equivalents thereof.

What is claimed is:

1. A method for inputting acceleration data into a computer comprising:
   measuring differences in characteristics of electromagnetic coils over time in response to changes of a magnetic field in a magnetic fluid due to displacement of a non-magnetic inertial body suspended in the magnetic fluid, said electromagnetic coils and said magnetic fluid being a part of a sensor and said electromagnetic coils arranged as three electromagnetic coil pairs, each pair substantially mutually perpendicular to each other; and
   reporting said differences in characteristics of electromagnetic coils in real-time as angular acceleration data to a computer.

2. The method as recited in claim 1, wherein the measuring comprises:
   registering alternating voltage components of said electromagnetic coils;
   computing changes in said alternating voltage components; and
   computing linear acceleration components for an x-axis, a y-axis and a z-axis.

3. The method as recited in claim 2, wherein computing the linear acceleration components for the x-axis, y-axis, and z-axis comprises performing the computation according to respective formulae, $a_x = p \times [(U_{x1} - U_{x1}^0) - (U_{x2} - U_{x2}^0)]$, $a_y = p \times [(U_{y1} - U_{y1}^0) - (U_{y2} - U_{y2}^0)]$, $a_z = p \times [(U_{z1} - U_{z1}^0) - (U_{z2} - U_{z2}^0)]$.

4. The method as recited in claim 2, further comprising computing angular acceleration of said sensor, said angular acceleration relating to rotation around any of the x-axis, the y-axis and the z-axis.

5. The method as recited in claim 4, wherein computing the angular acceleration comprises calculating the angular acceleration according to formulae, $\psi_x = P \times [(U_{y1} - U_{y1}^0) + (U_{y2} - U_{y2}^0)]$, $\psi_y = P \times [(U_{x1} - U_{x1}^0) + (U_{x2} - U_{x2}^0)]$.

6. The method as recited in claim 2, further comprising computing changes in Q-factors of said electromagnetic coils.

7. The method as recited in claim 2, further comprising computing changes in inductance of said electromagnetic coils.

8. The method as recited in claim 2, further comprising initializing said sensor to establish a starting equilibrium condition.

9. The method as recited in claim 1, further comprising moving said sensor and thereby causing changes in alternating voltage components of said electromagnetic coils;
   causing differences in Q-factors of said electromagnetic coils; and
   causing differences in inductance of said electromagnetic coils.

10. The method as recited in claim 1, wherein the reporting comprises:
    packaging three components of linear acceleration and three angular acceleration components for transmission as a data packet to the computer; and
    transmitting said data packet to the computer.

11. The method as recited in claim 1, wherein the differences in characteristics of said electromagnetic coils comprise differences in Q-factors.

12. The method as recited in claim 1, wherein the differences in characteristics of said electromagnetic coils comprise differences in inductance.

13. The method as recited in claim 1, wherein said sensor comprises a plurality of sensors.

14. The method as recited in claim 1, wherein said computer comprises a plurality of computers.

15. An input device for detecting acceleration of a sensor comprising:
    a vessel containing fluid;
    a non-magnetic inertial body in the vessel;
    means to create magnetic fields within said vessel;
    means for detecting changes in magnetic fields caused by movement of said inertial body relative to the vessel; and
    means for computing angular acceleration based on said changes in the magnetic fields.

16. The device as recited in claim 15, further comprising:
    means for computing linear acceleration based on said changes; and
    a means for reporting said linear acceleration and said angular acceleration in real-time to a computer.

17. The device as recited in claim 16, wherein multiple sensors communicate to said computer by a wired connection.

18. The device as recited in claim 16, wherein multiple sensors communicate to said computer by a wireless connection.

19. The device as recited in claim 15, further comprising means for detecting and computing inductance changes.

20. The device as recited in claim 15, wherein said means to create magnetic fields comprises one or more constant magnets.

21. The device as recited in claim 15, further comprising a means for detecting and computing Q-factor changes.

22. The device as recited in claim 15, wherein the fluid comprises magnetic fluid.

23. An input device comprising:
    a housing;
    a magnetic fluid within the housing;
    a non-magnetic inertial body within the housing; and
    magnetic field sources generating magnetic fields within the magnetic fluid,
    wherein angular acceleration of the housing is calculated based on changes in the magnetic fields.

24. The device of claim 23, wherein the inertial body comprises at least two materials.

25. The device of claim 24, wherein the at least two materials are non-magnetic.

26. The device of claim 23, wherein the inertial body is hollow.

27. The device of claim 23, wherein the magnetic field sources comprise electromagnets.

28. The device of claim 23, wherein the magnetic field sources comprise permanent magnets.

29. The device of claim 23, wherein each magnetic field source comprises a permanent magnet and an electromagnet.

30. The device of claim 23, further comprising a plurality of magnetic coils for sensing the changes in the magnetic flux lines.

31. The device of claim 23, wherein the housing is a closed volume.

32. The device of claim 23, wherein the housing is a centrally symmetric polygon.

33. The device of claim 23, wherein the housing is polygonal.

34. The device of claim 23, wherein the housing is spherical.

35. The device of claim 23, wherein the magnetic field sources comprise six magnetic field sources.

36. The device of claim 23, wherein the magnetic field sources are oriented along perpendicular axes relative to each other.

37. The device of claim 23, wherein the changes in magnetic flux lines are also indicative of linear acceleration of the housing.

38. The device of claim 23, wherein the magnetic fluid exerts a repulsive force on the inertial body so as to maintain the inertial body in an approximate center of the housing.

39. The device of claim 23, further comprising:
a data output from the magnetic field sources; and
a signal converter assembly; and
a plurality of switches,
wherein the data output is connected to an input of the signal converter assembly, and
wherein an output of the signal converter assembly is connected to a computer.

40. The device of claim 23, wherein each magnetic field source comprises a current generator and an inductor coil connected in series,
wherein outputs of the current generators drive corresponding magnetic field sources.

41. An input device comprising:
a housing containing a magnetic fluid;
a non-magnetic inertial body within the magnetic fluid;
magnets positioned to generate a magnetic field in the magnetic fluid; and
a data output from the magnets,
wherein angular acceleration of the housing is calculated based on the data output that represents changes in the magnetic field.

42. An input device comprising:
a magnetic fluid;
a non-magnetic inertial body suspended within the magnetic fluid; and
magnetic field sources generating magnetic fields in the magnetic fluid so that the magnetic fluid exerts a repulsive force on the inertial body to maintain the inertial body approximately in place,
wherein angular acceleration of the input device is calculated based on changes in the magnetic fields.

43. The device of claim 42, wherein the inertial body comprises at least two materials.

44. The device of claim 43, wherein the at least two materials are non-magnetic.

45. The device of claim 42, wherein the inertial body is hollow.

46. The device of claim 42, wherein the magnetic field sources comprise electromagnets.

47. The device of claim 42, wherein the magnetic field sources comprise permanent magnets.

48. The device of claim 42, wherein each magnetic field source comprises a permanent magnet and an electromagnet.

49. The device of claim 42, further comprising a plurality of inductive coils for sensing the changes in the magnetic field.

50. The device of claim 42, further comprising a housing enclosing the magnetic fluid and the inertial body, wherein the housing is a closed volume.

51. The device of claim 42, further comprising a housing enclosing the magnetic fluid and the inertial body, wherein the housing is a centrally symmetric polygon.

52. The device of claim 42, further comprising a housing enclosing the magnetic fluid and the inertial body, wherein the housing is polygonal.

53. The device of claim 42, further comprising a housing enclosing the magnetic fluid and the inertial body, wherein the housing is spherical.

54. The device of claim 42, wherein the magnetic field sources comprise six magnetic field sources.

55. The device of claim 42, wherein the magnetic field sources are oriented along perpendicular axes relative to each other.

56. The device of claim 42, wherein the changes in the magnetic field are also indicative of linear acceleration of the device.

57. The device of claim 42, further comprising:
a data output from the magnetic field sources; and
a signal converter assembly;
wherein the data output is connected to the signal converter assembly, and
wherein an output of the signal converter assembly is transmitted to a computer.

* * * * *